United States Patent [19]

McCutchen

[11] Patent Number: 5,703,604

[45] Date of Patent: Dec. 30, 1997

[54] IMMERSIVE DODECAHERDRAL VIDEO VIEWING SYSTEM

[75] Inventor: David McCutchen, Portland, Oreg.

[73] Assignee: Dodeca LLC, Portland, Oreg.

[21] Appl. No.: 445,658

[22] Filed: May 22, 1995

[51] Int. Cl.$^6$ .................................................. G09G 5/00
[52] U.S. Cl. ........................ 345/8; 348/36; 348/38; 348/39
[58] Field of Search .................. 345/121, 8, 5, 345/31; 348/36, 38–39, 42, 51, 383, 744; 463/32–34; 353/94

[56] References Cited

U.S. PATENT DOCUMENTS

| | | | |
|---|---|---|---|
| 3,692,934 | 9/1972 | Herndon | 348/36 |
| 3,992,718 | 11/1976 | Driskell | 348/36 |
| 4,195,911 | 4/1980 | Bougon et al. | 348/38 |
| 4,772,942 | 9/1988 | Tuck | 348/38 |
| 4,868,682 | 9/1989 | Shimizu et al. | 348/38 |
| 4,974,073 | 11/1990 | Inova | 348/38 |
| 5,023,925 | 6/1991 | McCutchen | 348/38 |
| 5,130,794 | 7/1992 | Ritchey | 348/39 |
| 5,153,716 | 10/1992 | Smith | 348/39 |
| 5,179,440 | 1/1993 | Loban et al. | 348/383 |
| 5,185,667 | 2/1993 | Zimmerman | 348/36 |
| 5,187,571 | 2/1993 | Braun et al. | 348/39 |
| 5,200,818 | 4/1993 | Neta et al. | 348/39 |
| 5,313,306 | 5/1994 | Kuban | 348/65 |
| 5,539,483 | 7/1996 | Nalwa | 353/94 |
| 5,546,139 | 8/1996 | Bacs, Jr. et al. | 348/36 |

OTHER PUBLICATIONS

"VTR Developer's Manual" From Warp CA. pp. 3, 31–32, Jan. 1995.

"Virtual TV FAQ" Warp CA., Nov. 12, 1995.

"Computer Pictures" Warp California Stretches Video into Virtual Worlds, by Reveaux, Tony p. 8, Jan.–Feb. 1995.

"TV Technology" Feb. 1995, QTVR Putting a Spin on Desktop.

"An Overview of Apple's Quicktime VR Technology" May 23, 1995, p. 13.

Primary Examiner—Mark R. Powell
Assistant Examiner—Martin Loui

[57] ABSTRACT

Video image information representing an immersive image up to a complete spherical field of view is utilized by a special image processor to extract a region of interest as a moveable window. The immersive image is divided into standardized pentagonal segments according to the geometry of the dodecahedron, and these segments are carried as a plurality of video channels. The image processor extracts and assembles the moveable region of interest from among the various segments of the image as they are recorded in a segmented memory, according to pointing device information from the user, such as a joystick or the tracker of a head-mounted-display. The video image information used can come from sources including a photographic camera system recording scenes from the real world, and can be either live or prerecorded. Existing methods for transmission of video channels can be used to broadcast such immersive images. A special encoding of pentagon information can be used to conserve bandwidth and reduce the number of channels required, or to add information for a stereoscopic effect. independently movable windows within a single overall spherical video image input can be produced when more than one viewing processor is used.

18 Claims, 12 Drawing Sheets

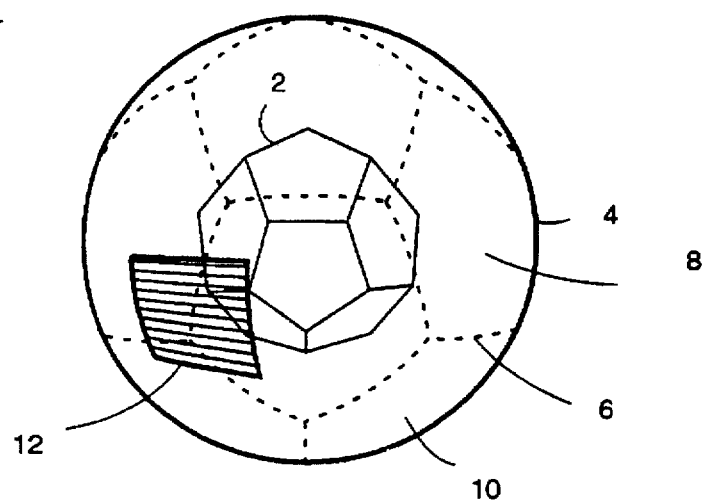
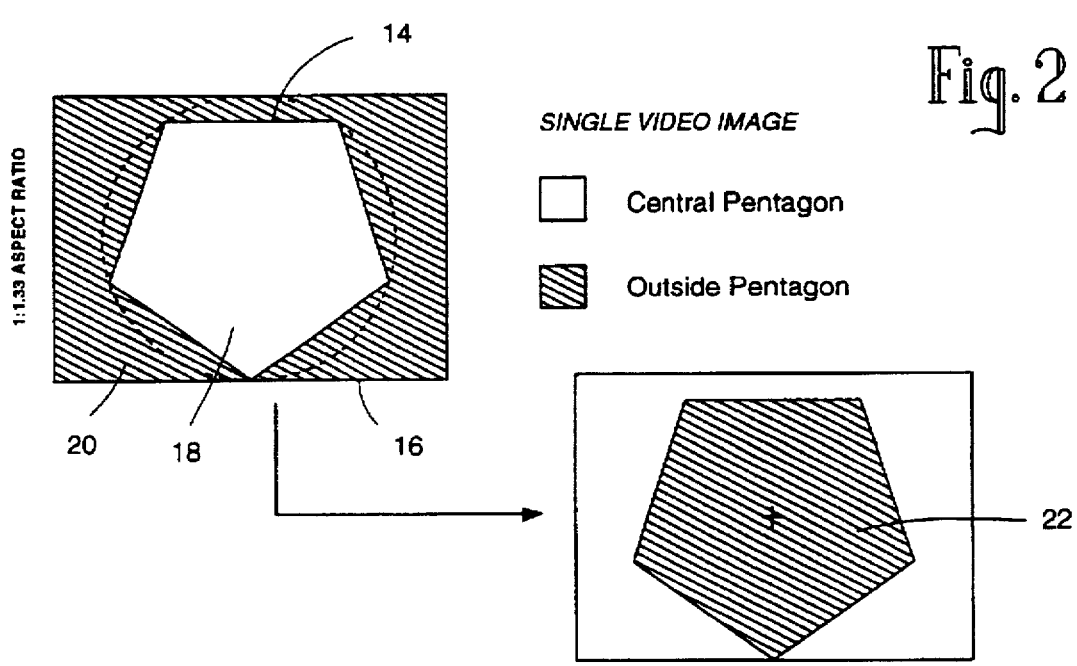

(Viewpoint is from center of spherical field of view)

(Viewpoint is from center of spherical field of view)

IMMERSIVE DODECAHERDRAL VIDEO VIEWING SYSTEM

BACKGROUND

1. Field of the Invention

This Invention relates to panoramic television and visual display systems featuring a movable window of interest, and is also related to coded data transformation techniques, including translation by means of look-up tables, and to storage address formation, addressing, and storage access control processing.

2. Description of the Prior Art

This application relates to the Applicant's Disclosure Document 346,065 of Jan. 18, 1994.

Panoramic photography, to encompass a wider field of view, has been attempted with many systems, both for film and for video cameras. For example, fisheye lenses may be used on cameras to record a hemispherical field of view in a single exposure. However, to gain greater overall resolution and more control over separate sections of the image, multiple exposures can also be used to create a composite wide-angle image.

Many systems of composite photography have been attempted. An optimum system would be one based upon a simple standard picture shape, with equal edges, and a simple and consistent organization that lends itself to a variety of formats and applications. These qualities are characteristic of the system described in the Applicant's previous U.S. Pat. No. 5,023,725 "Method and Apparatus for Dodecahedral Imaging System," where an imaging system is described based on the geometry of the pentagonal dodecahedron. In this patent, a viewfinder apparatus is described whereby a movable region of interest is filled by combining information from one or more one pentagonal video images held in a virtual memory. The present invention further defines this process, and shows how it can be used for viewing of recorded multichannel panoramic video images recorded using this system, as reproduced in several different ways.

Other prior art focuses on extracting a window of interest from a single video image, usually representing a hemispherical field of view. Warp California has demonstrated a dynamic windowing system that corrects for the distortion inherent in an overall fisheye image in order to present a natural appearance in the extracted window. This approach works fairly well with high-resolution still source images because the extracted portion still has an acceptable level of resolution, but when the source footage is video, the resolution suffers because only a tiny portion of the video is made to fill up the entire screen. The Warp system, also known as VTV, includes a provision for the use of a cubical arrangement of substantially overlapping hemispherical views. Further work has also been done by Warp with the stitching together of a set of dodecahedral views, supplied by the Applicant, as a single curved global map, from which a movable window of interest can be derived. But this approach depends on the amount of bandwidth that a single digital video image can convey, which limits the amount of resolution possible in the final extracted image, and on several warping and dewarping steps applied to the source images that are omitted in the present invention.

The extraction of a movable window from a single hemispherical fisheye source image is found in Kuban, et. al. in U.S. Pat. Nos. 5,185,667 and 5,313,306 "Omniview Motionless Camera Endoscopy System" by Kuban, et. al. This also suffers from the lack of resolution in the extracted image.

In U.S. Pat. No. 5,130,794 "Panoramic Display System" by Ritchey a single video image of a near-spherical field of view is subdivided and sent to a multiplicity of flat display panels in a cubical room for viewing, in addition to being viewed by means of sending a portion of the image to a head-mounted display, through means not described. The geometry used to subdivide the image is according to a cube. This approach suffers from the amount of processing equipment required to subdivide and route the image, and the significant loss of resolution as the one video image is subdivided and stretched over such a wide area.

Other new forms of video processing have attempted to create a means of providing a panoramic source image from which a moving window of interest can be extracted. Apple Computer's new Quicktime™ VR system is a set of programming tools for splicing together from 8 to 30 photographed views into an apparently continuous scene up to 55° above and below the horizon. From this source image, a movable window of interest can be extracted, with the somewhat squashed appearance of the source image corrected for in the extracting process so that the extracted image looks natural. However, this program at present does not include ways to include the very top or the bottom of a spherical field of view, and the movable window display is small, jerky and low-resolution. The images used in the extraction process are assumed to have been mapped around a cylindrical projection of a globe, which introduces distortion and changes of resolution, especially at the poles. There are also no announced plans to make the source panoramas available in a continuous stream to enable real-time motion in the extracted window.

Some other examples of U.S. Pat. No. 5,187,571 "Television System for Displaying Multiple Views of a Distant Location" by Braun, et. al., which describes a television transmission system using composite cameras to cover a wide field of view, and a composing station to select a widow of interest from among these available views to be displayed on a monitor. However, this presupposes that this single region of interest will be all that is selected to be sent to a viewer, and so requires that a significantly different transmission device be provided for each and every viewer.

In U.S. Pat. No. 5,200,818 "Video Imaging System with Interactive Windowing Capability" by Neta & Neta, describes a generalized compound imaging system simultaneously displaying an overall image of the entire panoramic scene as well as a roving window of interest. This requires a dual display system.

U.S. Pat. No. 5,153,716 "Panoramic Interactive System" by Smith describes a film viewing system wherein a portion of a recorded film panoramic image is displayed by a mechanical rotary apparatus controlled by the user. Besides being restricted to film images only, this invention also has limited provision for displaying images in motion.

Purposes and Advantages of the Present Invention

The present invention intends to define the means for:

a. the efficient viewing of a selected portion of a panoramic spherical video image comprising a very wide field of view, up to a complete sphere, b. the creation of this panoramic spherical image by means of standardized segments, with this standardization yielding important savings in processing time, c. the reproduction and transmission of these standardized image segments comprising this panoramic spherical image through existing means of video reproduction and transmission, d. the display of the selected region of interest on existing means for viewing video images, e. the further provision for encoding additional information in the video image so that each video image can carry two pentagonal segments, f. the description of how the image information represented by the pentagonal segments can be applied to the display of three-dimensional images.

g. the description of how the image information representing the total field of view can be shared by more than one viewer, enabling independent regions of interest to be extracted.

BRIEF DESCRIPTION OF THE DRAWINGS

FIG. 1: A pentagonal dodecahedron projected onto a concentric spherical field of view.

FIG. 2: A single-pentagon image shown within a common video aspect ratio, and showing the area both inside and outside the central pentagon.

DETAILED DESCRIPTION OF THE PRESENT INVENTION

Figure 3:
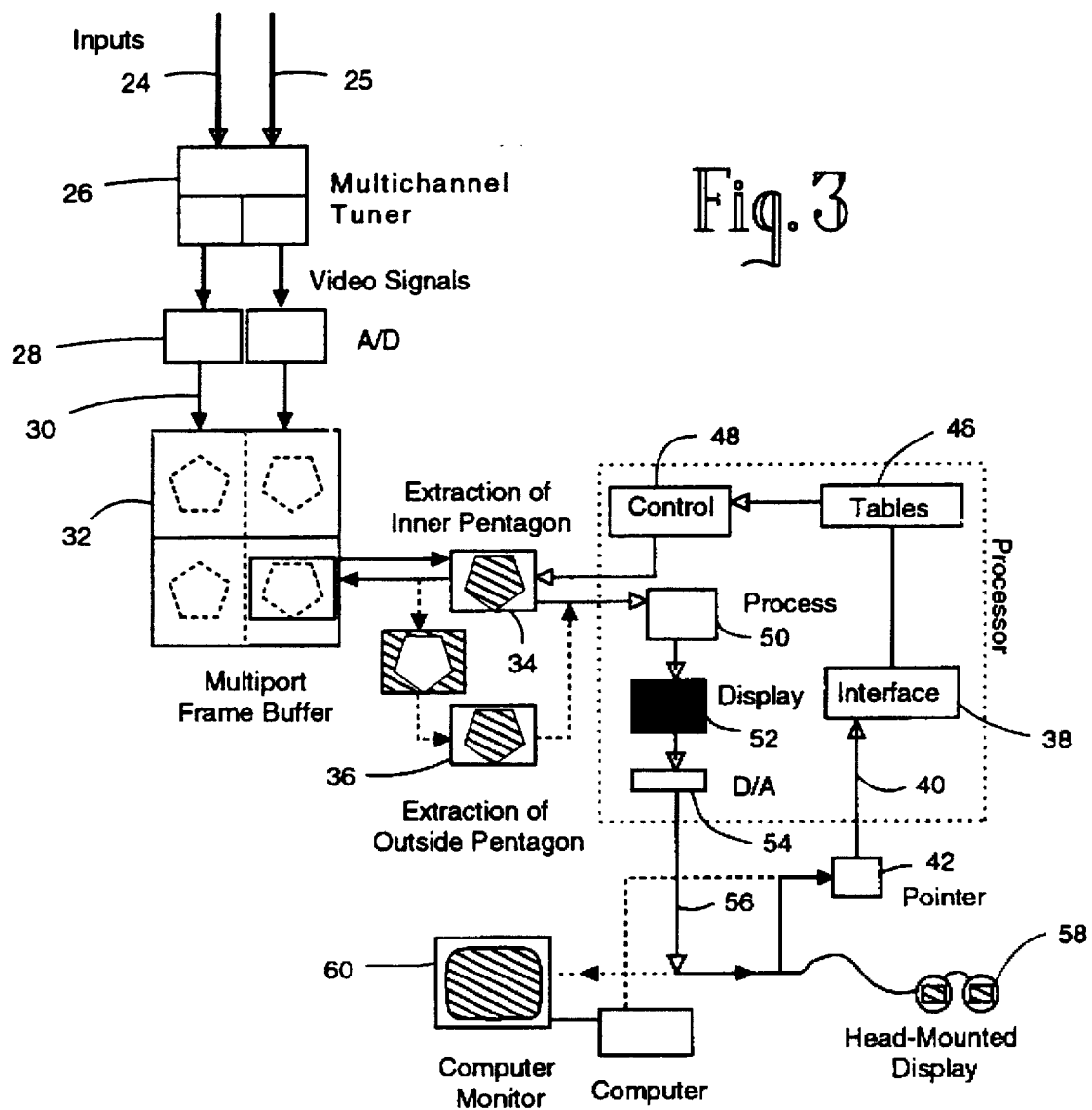
FIG. 3: A block diagram of the components of the present invention showing a system for single-viewer access to the components of the panoramic image.

The present invention is a device that enables the viewing of immersive video environments. With the present invention, one or more people can look into, and look around in, what appears to be another world, which could be photographically real in appearance.

The principle of the present invention is that several video images, most commonly full-motion video images, are assembled into a spherical panorama. This assembly takes place within a frame buffer, to create a "Datasphere." A point-of-view device, such as a head-mounted display (HMD), is used to specify which area of this Datasphere will be extracted and displayed as a video image.

The most efficient means for generating and combining images for a spherical panorama is a dodecahedral system of pentagonal segments, the RoundAbout™ immersive imaging format. FIG. 1 shows a pentagonal dodecahedron 2 projected onto a sphere 4 representing a concentric spherical field of view. The lines between the pentagonal facets of the dodecahedron thus produce pentagonal divisions 6 between image segments 8 and 10. A rectangular region of interest extracted from the overall spherical image is shown at 12. A complete spherical image is made up of 12 pentagonal segments or pentagons. Since the bottom one is usually omitted, to allow room for a camera mount, the maximum is usually 11 pentagons. Smaller numbers such as a three, four, or six-pentagon image can still create a wrap-around, immersive effect. For a 3-D image, where separate views have to be presented to the right and left eye, the number of pentagons required is therefore doubled, up to a maximum of 22.

The image in each pentagon is extracted from a larger video image. In FIG. 2 a single-pentagon image 14 is shown within a video image 16 with a common 4:3 video aspect ratio, and showing the area both inside 18 and outside 20 the central pentagon. For the usual NTSC video image, a central pentagon 14 takes up just over 44% of the image area. The outside area 20 around this central pentagon can be ignored, or a portion of it can be used as an extension of the central pentagon to fill in missing parts of adjacent images, or this outside region can be used to encode a second pentagon, shown here extracted at 22, which could be a separate view, or a stereoscopically offset view of the central pentagon that would be required for a 3-D image. The use of digital video images is preferred because of its clarity and precision, but the basic technology for the Invention will also work for analog recording and transmission methods.

The multiple video images are carried over separate but parallel video channels. These channels can be produced by simultaneous playback through multiple video recorders, linked through a common time reference such as SMPTE time code. Or the channels can be actual video channels from multichannel RF telecasting such as is carried over existing cable systems, or compressed digital channels such as those in planned cable and direct-broadcast satellite systems, which include digital compressed multiple video streams within the bandwidth heretofore reserved for a single video stream.

The present invention is designed to be a quick, simple, and inexpensive device for displaying portions of an overall panorama. Because it does not rely on generated computer graphics, it can have a quicker and more natural response time than any other type of VR device. Thus the present invention represents a simple way for even people at home to view broadcast environments, and for the cable and telecast industry as a whole to take the step up to panoramic video, telepresence, and a form of photorealistic virtual reality.

COMPONENTS OF THE PRESENT INVENTION

The components of the present invention will be described in the order in which the video signal enters and exits the device according to FIG. 3:

Analog 24 or digital 25 video signal inputs
Multichannel tuner 26 (optional)
Analog-to-digital Conversion 28 (optional)
Digital Frame Buffer Input 30
Multiport Input Video RAM Frame Buffer 32
Addressing Logic Devices for individual channels:
  Extraction of central pentagon 34
  Extraction of outside pentagon 36
Display Device Interface 38
Pointing indication input 40 from Pointer 42
Tables of Addresses based on position of ROI 46
Control of Readout of Main Frame Buffer 48
Scan Line Converters and Anti-aliasing 50
Display Frame Buffer 52
Digital-to-Analog Conversion 54
Output to Display Device 56

DETAILED DESCRIPTION OF DESIGN AND COMPONENTS

Video signal inputs:

The present invention employs means for the input of more than one video signal. While the separate video signals can be supplied from a series of separate but linked video playback devices, it is more likely that a consumer device will rely upon extraction of the channels from existing and planned telecast systems which combine several channels into one signal sent to the home. Existing UHF and VHF carried through analog cable systems already carry about 50 channels; by the use of digital compression and multiplexing of several channels into one, the capacity of these systems is predicted to rise to 500 channels or more in the near future. Other multichannel network connections into the home will be provided in the near future through direct satelllite transmission, cable modems, and phone lines. The present invention is a way to use a group of these channels to present the components of a panorama, and thus build up a new, expanded type of television image. Planned FCC spectrum allocations for HDTV broadcasting assume that each HDTV channel will also be capable of holding 6 regular TV channels. Thus each HDTV channel could also carry up to twelve pentagons for a wrap-around immersive image.

Analog system:

As a way to get the present invention into use immediately, using existing video transmission systems, first the input means for an analog system will be described.

A. RF Cable connection

The "RF IN" connection on the back of the present invention is a common RF coaxial cable connector as an input device 24. An "RF OUT" connector can also be provided for passing on this cable signal to other devices farther downstream such as a VCR or TV.

C. Multichannel Tuner

Within the present invention is a set of miniaturized tuners 26, similar to the tuners in existing TVs and VCRs, which are set to the relevant channels:carrying the components of the panoramic image. For simplicity of design, it is preferable that these channel frequendes be set ahead of time. However, it is possible that the channels could be located "on the fly" if the broadcast signal contains a certain code, such as in a relatively unused portion such as the vertical interval, that will alert the tuner that it is such a special type of television channel. The optimum arrangement of channels would be as grouped together sequentially as possible, because in that case a single tuner could be used, with a relatively simple stepping-down of a single frequency used to extract the other relevant channels.

C. Analog-to-Digital Conversion

The multiple parallel video signals are synchronized by matching their scan rates through a series of FIFO delays, and converted into digital form by a series of synchronized A-D converters 28. These streams of digital information are then passed on to the central frame buffer.

Digtal System

Upcoming digital transmission systems assume that more than one compressed video signal is contained within each 6 MHz video channel delivered to the home. To decompress and extract these signals, "set-top" decoders are often assumed to be involved, although there are other schemes that could decompress these signals before they are delivered to the home.

A(1). Cable Connection

A "CABLE IN" connector on the back of the present invention takes the delivered signal on a coaxial cable into the unit as an input 25. A "CABLE OUT" connector can also be provided for passing on this cable signal to other devices farther downstream such as a VCR or TV. Other methods of delivering a digital video stream into the home are also under development, such as through the phone lines or on CD-ROMs or Digital Videodisks (DVDs). These too could be applied to this connection with the appropriate conversion interface.

B(1). Channel Decoding

The digital video stream is decoded into its component channels, each of which contains information representing multiple video signals, and one or more channels are selected upon demand.

B(2). Channel Demultiplexing

The information streams representing the multiple video signals combined within the selected channels are identified and separated out. (This step and two previous steps are found in planned and current set-top receivers. Therefore, if the present invention can make use of their circuitry, for instance through a plug-in card, then these steps do not have to be a part of the present invention device itself.)

C. Channel Decompression and Output

Selected video streams are decompressed and reconstituted as video signals. Unlike current set-top devices, which assume that only one video signal will be decompressed, the present invention will select and decompress multiple video signals. Ideally, the relevant associated channels needed to build up a panoramic image will be all within the same overall channel group. Thus, for example, a channel could contain 6 video signals, compressed 6:1 (a ratio well within present technology), each representing a part of an overall panorama. Having the signals representing the parts scattered among multiple channels increases the complexity of the tuning and decompression process.

If the preceding means for input of video signals are contained in a plug-in card for a set-top device or a personal computer, then in effect this card will work as a multiple-channel tuner as in step 2 above, outputting multiple video signals. Since these signals are already digital, they can then be passed on directly to the central frame buffer in the external present invention box via a high-speed parallel connector. The PCI bus is an example of a high-speed digital connection that could handle this type of bandwidth.

Digital Frame Buffer Input

The multiple digital video streams within the present invention represent the pentgonal facets of the "Datasphere". How many facets there are determines how much of a spherical field of view will be available to be seen. For example, a four-pentagon view represents the total width of normal human vision. A six pentagon-view is a full hemisphere, such as a view down to the horizon in every direction.

4. Multiport Input Video RAM

Figure 4:
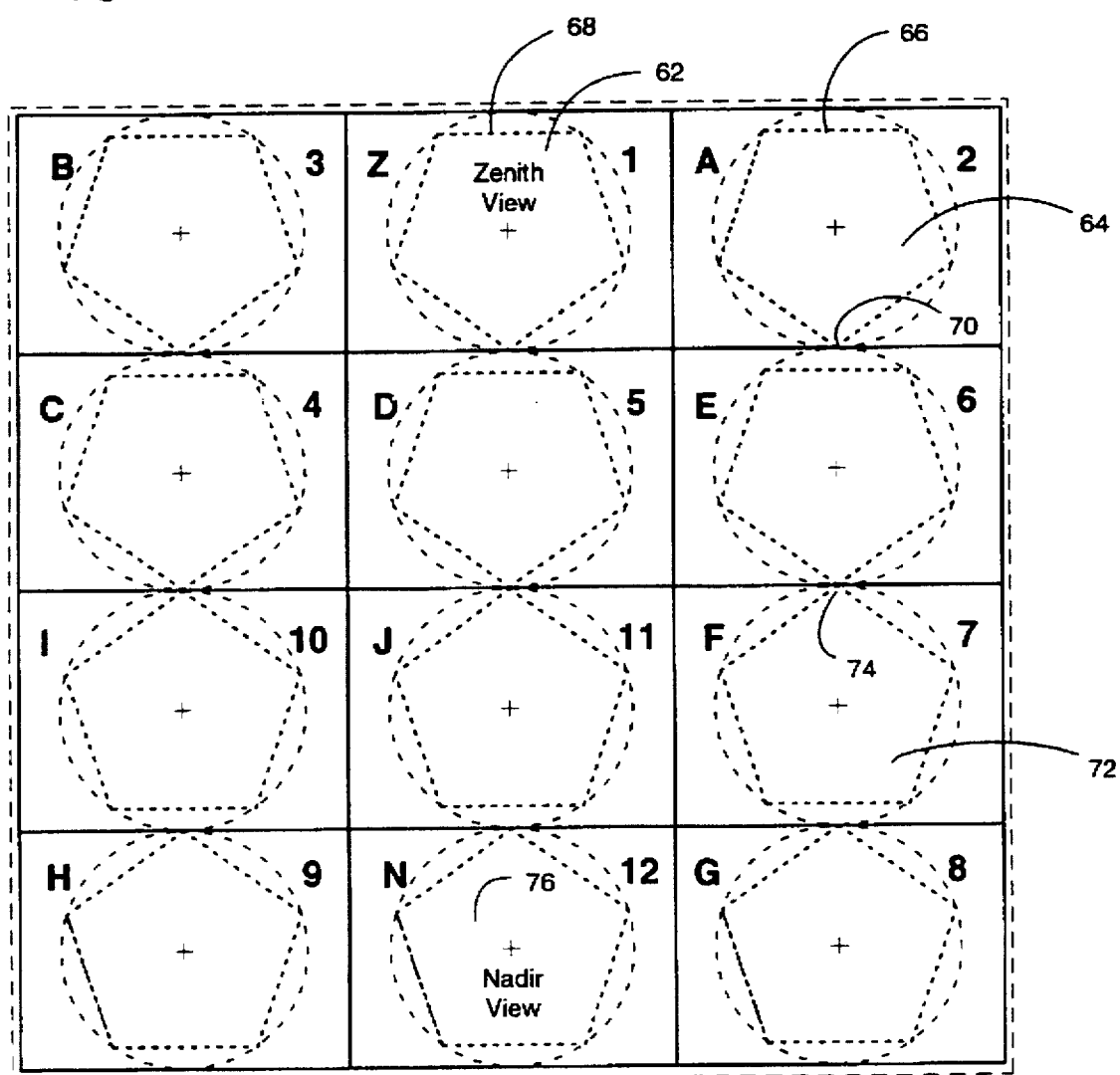
FIG. 4: A schematic representation of a main frame buffer, showing the regions for storage of up to twelve video images, and the pentagonal images they contain.

The multiple video streams are first mapped onto digital memory means comprising a large central frame buffer, shown in FIG. 3 at 32. This main memory can either be a single Random Access Memory or multiple memories virtually linked by addressing. A VRAM of at least 2 MB is needed, although a 4 MB VRAM, such as those made by Texas Instruments, is preferred. A dual division of this memory is the preferred embodiment of the present invention, to allow for an alternating-buffer process, where one of the buffers is being read as the other is being filled. FIG. 4 shows a schematic representation of one of these frame buffers, showing the regions for storage of up to twelve incoming video images, and the pentagonal images they contain. Each of the memory areas in a buffer is subdivided into up to twelve equal areas, representing the individual video images, and the video information from these video images is stored in these areas as simultaneously and independently as possible by multiport inputs. For example, this matrix could measure 1920 pixels square, representing three horizontal 640 pixel divisions, and four 480 pixel divisions.

The images are shown here lettered according to a standard system that identifies their position around a spherical field of view. This sequence starts with the zenith or Z pentagon at 62, then proceeds to the A pentagon at 64 whose top edge 66 is contiguous to the top of the Z pentagon at 68, and then in a dockwise direction, (as viewed from the center of the dodecahedron looking up) around the so-called above the horizon pentagons from A to E. These above the horizon pentagons are distinguished by having their points down, such as at 70. Continuing dockwise, the five below-horizon pentagons 72, from F to J, are distinguished by a pentagon cropping with the point up, such as at 74. The final bottom pentagon, the nadir or N, comes last in this sequence at 76.

Figure 5:
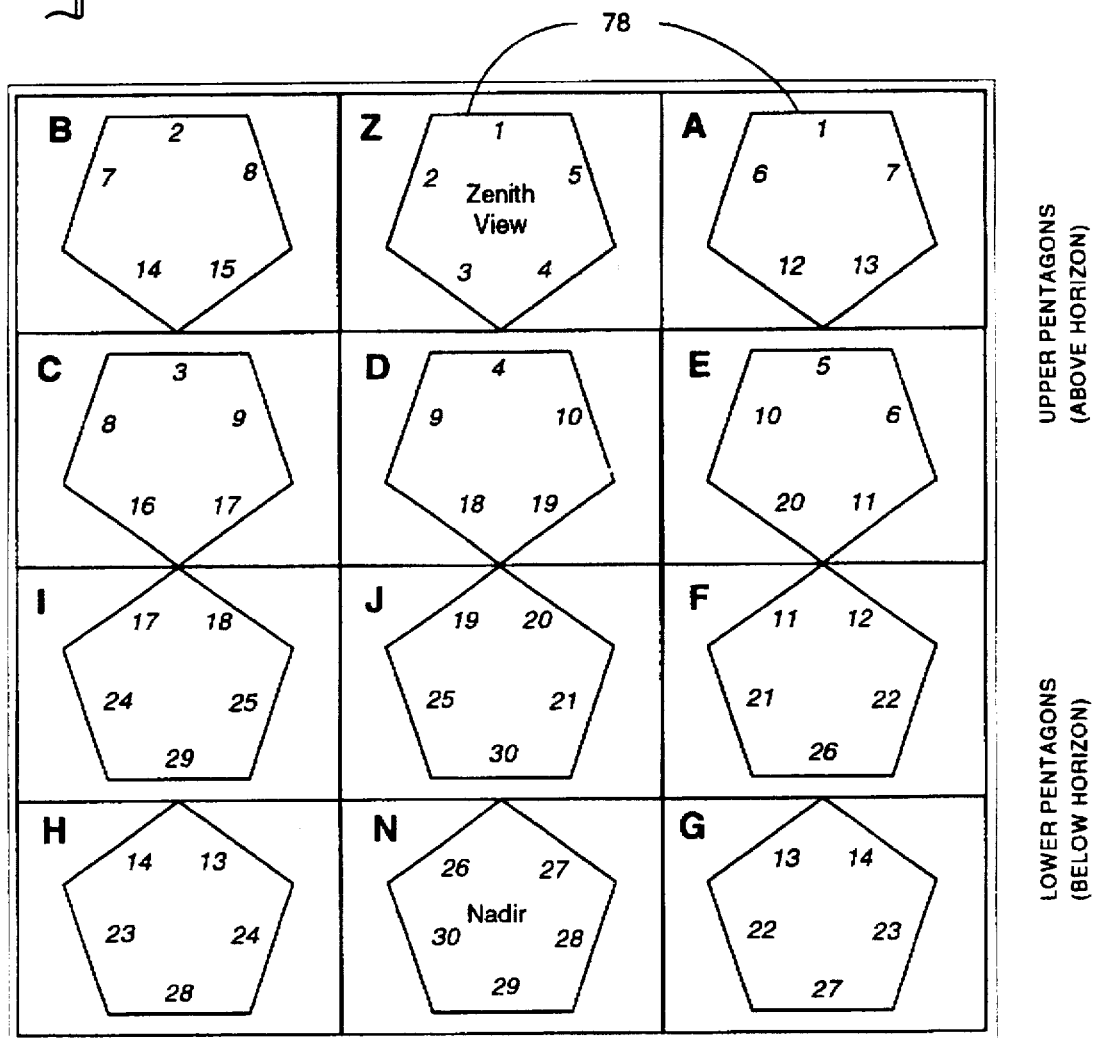
FIG. 5: Another view of this frame buffer, showing the matching of contiguous edges in the overall field of view.

The pentagons are here shown arranged in such a way that their edges are closest to each other overall, as can be seen in FIG. 5, so that someone viewing all or part of the multiple raw images can more easily follow the action as it proceeds from section to section. This is useful in the mastering process for viewing the unprocessed recordings. The thirty pentagon edges are here numbered, starting from the top of the Z view shown at 78, which corresponds to the top of the A view, and the other correspondences of the edges are shown.

Addressing Logic Devices for Individual Channels

The addressing means for this digital matrix begin with two kinds of logical routines which are applied in a modular fashion to each area representing an individual video image stream. For speed and low cost, these could be built as standardized programmable logic devices (PLDs).

5. Extraction of central pentagon

Figure 6:
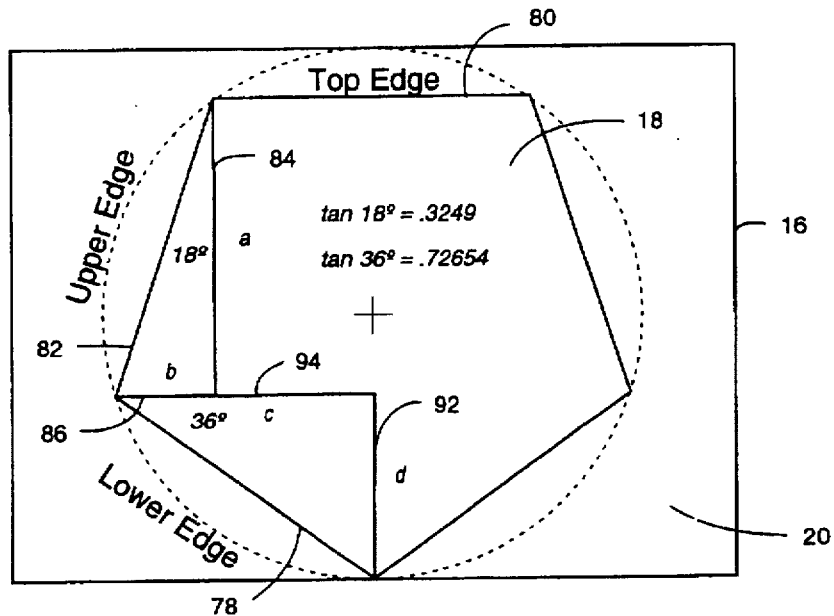
FIG. 6: A representation of a pentagonal border in a common video aspect ratio, and the component angles making up its edges.

The first device is the "Cropper." This PLD, shown in FIG. 3 at 34, identifies and extracts the essential central pentagonal area 18 from each video image 16. This central pentagon represents a dodecahedral facet of the Datasphere. The extracted pentagon is usually point-down for pentagons above the horizon, as shown in FIG. 6, and point-up for pentagons below the horizon. The location and type of extraction is specified by a setup command to the logic device, so that different types of telecast pentagon arrangements can be accomodated.

The pattern of cutting out a pentagon from a typical digital video image creates distinctive pixel patterns along two matching pairs of edges, plus the horizontal edge that completes the figure. These repeating pixel patterns can be incoporated as the basic logical components of the PLD. For a pentagon in the usual point-down orientation, there is the top horizontal edge 80, plus a right and left upper edge 82, and a right and left lower edge 84.

Figure 7:
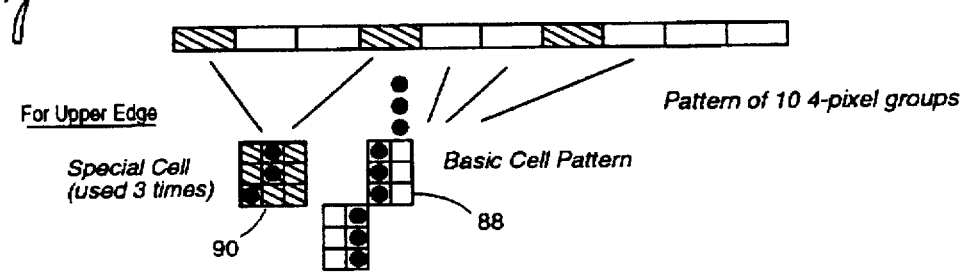
FIG. 7: Detail of cropping patterns for the upper pentagonal edge, expressed as repetitive pixel groups.

For a typical resolution of 640×480 pixels, this pattern comes in 40-pixel groups with 10 subdivisions of 4 pixels each. The pixel ratio of height 84 to width 86 (X axis to Y axis) for the upper edge is 40:13. Thus, there is a pattern of 10 4-pixel groups. As shown in FIG. 7 the first, fourth and seventh groups at 88 are 3 across and 3 down. The rest of the groups have a pattern 90 of 2 across and 3 down.

Figure 8:
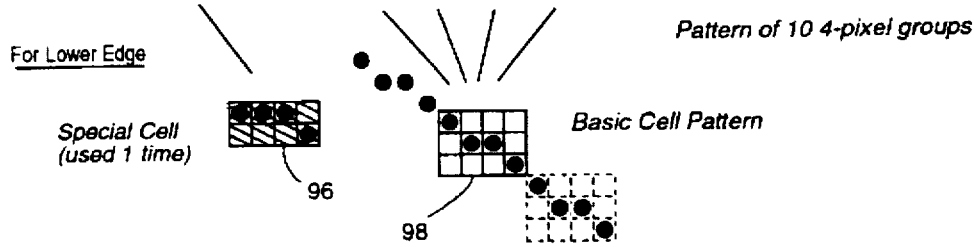
FIG. 8: Detail of cropping patterns for the lower pentagonal edge, expressed as repetitive pixel groups.

For the lower edges, the ratio of height 92 to width 94 (X axis to Y axis) is 29:40. The first pixel group for the lower edge, shown in FIG. 8 at 96 is 2 down and 4 across. The rest of the groups 98 are 3 down and 4 across.

6. Extraction of outside pentagon

The second PLD, the "Decoder", shown in FIG. 3 at 36, is optional. It works in conjunction with the Cropper, reading those parts of the video image 16 not inside the central pentagon. Within the usual 4:3 video aspect ratio, this outside area 20 represents enough "real estate" to encode a second pentgonal image according to a simple multiplexing and delay scheme, which is reversed to reconstitute the image. There is even room for a thin guardband between the central and the outside pentagons, and between the outside pentagon and the outside edge of the video frame 16. Thus the number of charmels required to carry the panoramic image is cut in half. This can be applied to providing an extra-wide image, for instance in expanding a 6-pentagon hemispherical view up to a full 12-pentagon sphere, or in making that 6-pentagon view 3-D.

To enable better blending of the pentagons, a sharp edge for the pentagons may not be desired, and the edges can be treated as the centers of fuzzy edges of blending of pixel values. However, this necessitates the accessing of picture information outside of these edges for the blending process, expanding the required area in the initial video image for the storage of the region pentagonal video image and its surrounding region. If this surrounding region represents more than 3% of the video image, then there is not enough room to fully encode a second comparable video image in the area surrounding the central pentagon, unless additional compression techniques are used.

Display Device Interface

Typically, a pointing device determines the direction of the viewer's gaze, to determine which area of the Datasphere will be displayed. If no pointing device is used, a fixed pentagon pattern is continually displayed in a panoramic pattern to surround the viewer. This reduces the cost of the viewing system. But the use of a gaze-following device allows the viewer to look around, a kind of simple and natural interactivity that dramatically increases the illusion of being in a real place.

Various gaze-tracking devices can be used, such as infrared and other optical sensors, mechanical booms, magnetic sensors such as the Polhemus system, joysticks, or acoustic devices such as the Logitech Mouse. The indication of the direction of gaze can be simply expressed from a point of view of the center of a sphere, looking at the outside surface, as a reading of longitude and latitude, with a tilt or pitch axis added as an option. The fewer the number of axes required, the more inexpensive the equipment. Thus even if more axes are reported by a device, they can be ignored to simplify the display calculations for the present invention.

Pointing indication input

The signal indication of the direction of gaze, shown in FIG. 3 at 40, which represents the center and orientation of the Region of Interest (ROI), comes from the pointing device 42, and is understood as readings of latitude, longitude, and optional tilt.

Position of ROI Tables of Addresses

These readings of ROI position are matched via a selection processor 38 to a set of look-up tables shown in FIG. 3 at 46, that includes the necessary readout sequence from the main buffer according to each ROI setting.

Figure 9:
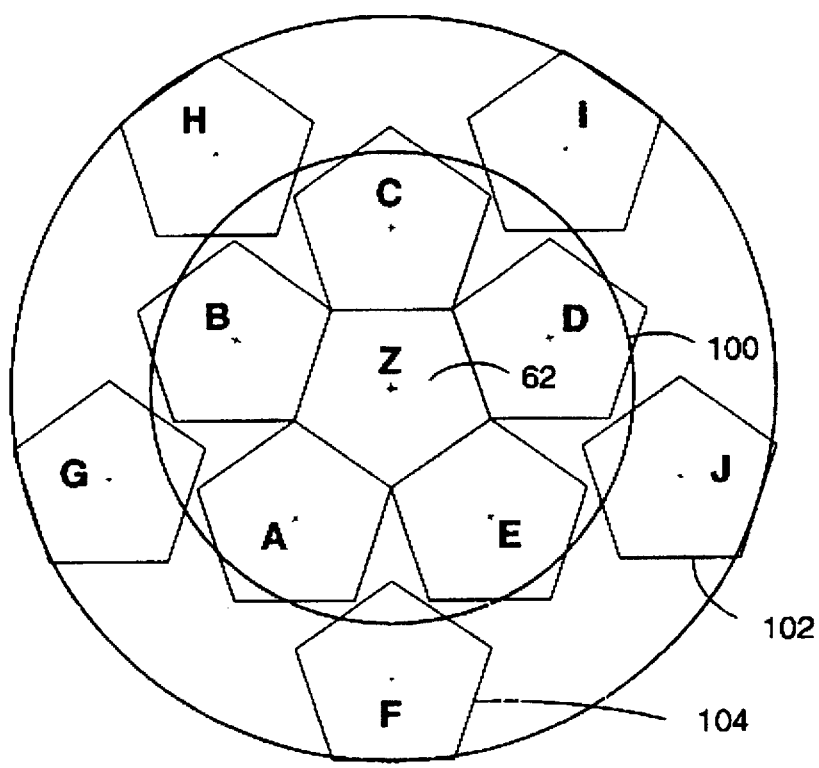
FIG. 9: Schematic view of eleven pentagons, representing a nearly-spherical field of view.
Figure 10:
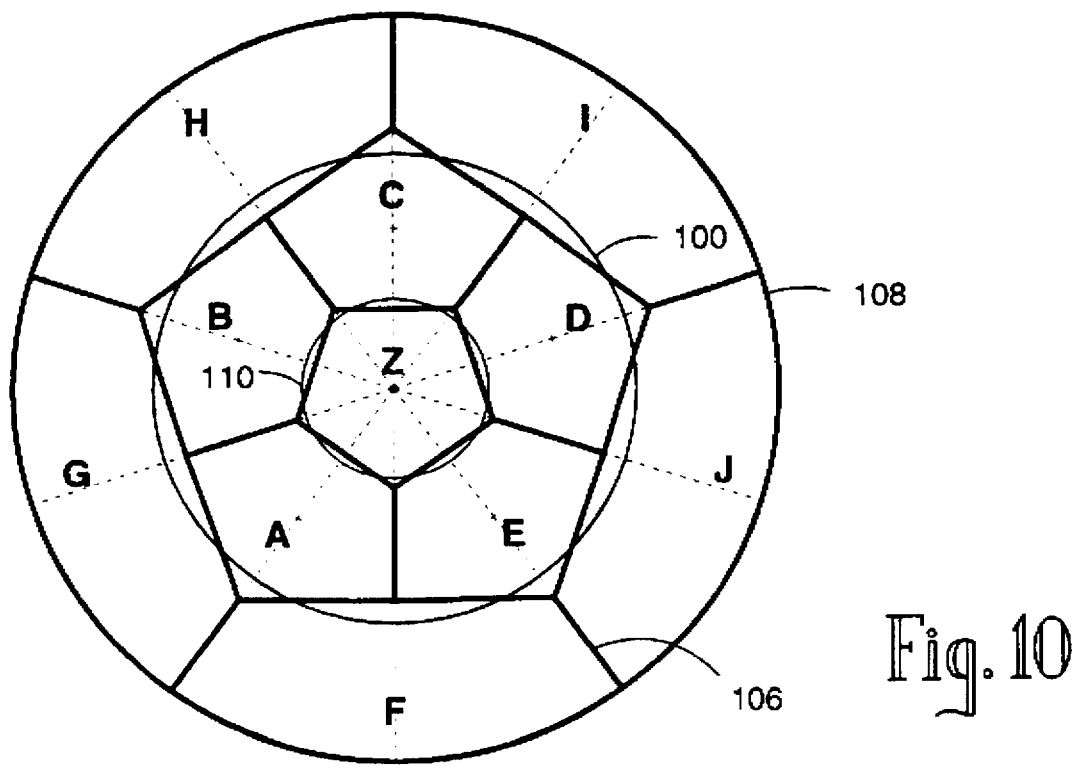
FIG. 10: Schematic view of these pentagons with their horizontal dimensions stretched according to a polar plot so that their edges are contiguous.

Plotting dodecahedral pentagons around the surface of a globe can help to generate these tables of addresses. Preplofted tables are preferable to calculated addresses because of the speed of response that they would bring to the system. A polar view of the pentagons and their relationship to a sphere is shown in FIG. 9 and FIG. 10. In FIG. 9 the pentagons of a dodecahedron are spread out, with the Zenith or top pentagon 64 in the center, the above-horizon pentagons around it, and the lower pentagons on the outside, below the horizon line 100 (the nadir pentagon is omitted). This representation assumes that the pentagons are in their original shape. However, FIG. 10 shows a polar plot whereby with a small change in width, progressing from the top to the bottom, edges of even outer pentagons, such as at 102 and 104 can be brought together, as at 106, without affecting the vertical distance seen here as the distance from the horizon 100 to the outer line 108, equivalent to 60 degrees south latitude, and the inner line 110, equivalent to 60 degrees north latitude.

Figure 11:
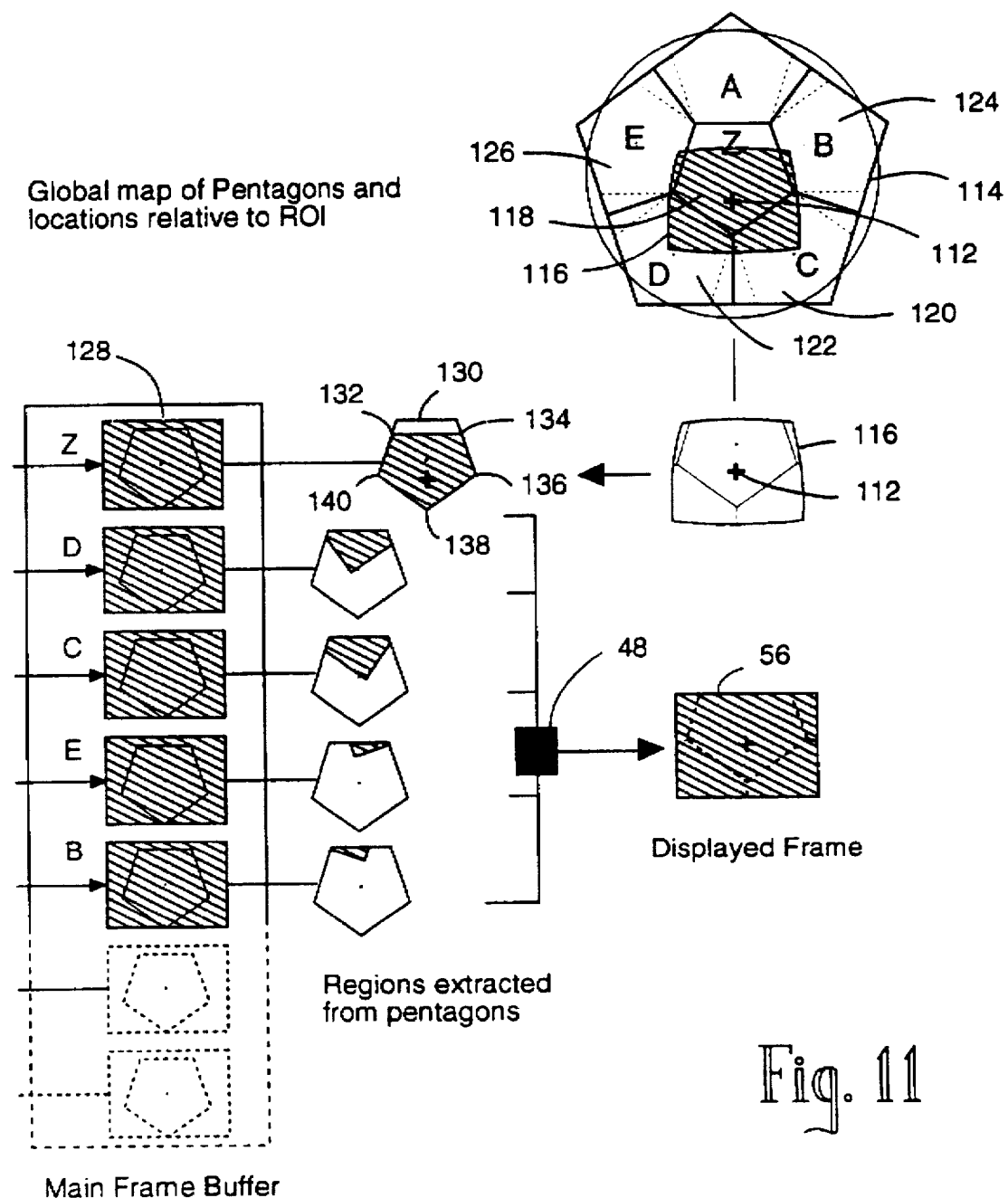
FIG. 11: Schematic representation of a Region of Interest superimposed on such a polar plot, and how this translates into extracted pixel groups from the original frame buffer holding the multiple video images.

Locating the center of the region of interest on the surrounding sphere triggers the automatic readout process from among the pentagons. A fuller picture of this readout process is shown in FIG. 11. These readout sequences can be multi-staged to save space and simplify calculations. For instance, the first table can indicate the number of pentagons involved. Thus a reading of an ROI center 112 of 70° N, 178° W (with no tilt), as shown here on a polar plot 114 of the six topmost pentagons, produces an ROI area 116 (at a given diagonal width of 100°) that will involve significant parts of pentagons Z 118, C 120, and D 128 and portions of pentagons B 130 and E 132. To conserve memory, this indication can be used to control the multichannel tuner to select only the affected video images and the pentagon segments they contain for loading into into the main memory. However, this introduces another level of complexity into the device, and the storage of only a portion of the total field of view would preclude another independent viewer from looking about by extracting a ROI from another region.

Another table can give the addresses of the corner points of the affected regions within each pentagon, so the boundaries of the target memory segments in the main free buffer are easily defined. For example, for the Z pentagon portion of the memory 128, as defined by the Cropper PLD 130, only corner points at 132 and 134 can be are given (points such as 136, 138 and 140 can be defined by default.) Another associated table lookup identifies where the start and end points of the readout shotLid be, and the direction of the initial scan. Because of the predictable structure of the main buffer and the extracted image, the information necessary for the calculation of all of these guide points can actually be inferred from only two points, the center of the ROI and the location of its upper left corner, equal to the start of the readout of the extracted image.

Readout of Frame Buffer

Once the target segments are identified, the readout of the video information in the main frame buffer begins, here from the identified initial point according to a readout control shown at 48 which follows the horizontal scan readout timing of a video signal Using an indicated direction of movement to determine the direction for the next video pixel, the digital video information is copied into the displayed frame signal 56.

At a boundary line, either for a pentagon (as indicated by the Cropper) or of a target segment in the main buffer, the readout skips to the adjacent pixel in the next contiguous pentagon or region and continues to the edge of the display video frame, at which point the scan resets to the start point, one scan line down, and continues. (Another table contains information about edge matching such as is shown in FIG. 5.)

Associated Readout Tables

Part of the readout process is changes of direction in the readout of the pixels. Thus each scan line in the output display buffer will trace a kind of zigzag path through the main frame buffer, skipping from one region and pentagon to another. Mostly these scan lines will be parallel, and form a generally repeating pattern. This can be expressed mathematically as a series of directional changes, steps, and repetitions.

Scan Line Converters and Anti-aliasing

As part of the assembly of the affected image segments into a naturalistic image in the display buffer, slight deformations in the scan pattern may be applied to the scan lines in the main frame buffer. By applying a slight deformation outward concentric to the center of each pentagon and to the center of the region of interest, each pentagon can be seen as it would be projected onto the surface of a surrounding sphere, and viewed from the center of that sphere, according to an orthographic projection rather than a gnomordc projection. This orthographic projection mimics the appearance of the original photographed spherical field of view, as seen in spherically-curved pentagonal image segments. This spherical distortion reaches a value of zero only at the points of each pentagon.

Anti-aliasing filters must also be applied to the pixel information as it is gathered from the main frame buffer, since the ideal location of the required pixels may not match the locations of the pixels in the frame buffer. Thus interpolations and weighted averaging may have to be done on the fly to determine the proper pixel value to be read into the display buffer, according to an appropriate calculation matrix.

Digital-to-Analog Conversion

As the display video image pixels are assembled, if the final display device is analog, they are converted from a digital form into an analog video signal, by the digital to analog converter 54 and exit the present invention along a normal BNC or RCA line video connector (with associated sound as provided with the original broadcast) as a signal shown in FIG. 3 at 56. If the described image processing is done in parallel, right- and left-eye views can be assembled for 3-D, as in what is commonly referred to as "Virtual Reality".

Output to Display Device

The optimum display device for the present invention would be a high-resolution Liquid Crystal Display (LCD) Head-Mounted-Display 58, with a different view presented to each eye for a three-dimension image. The image latency in the LCD should be less than 25 milliseconds to prevent smear in the image. The NTSC image from at least one eye can also displayed on a regular TV or Computer monitor 60, or recorded by a VCR. Others with head-mounted displays can also view the scene.

Figure 12:
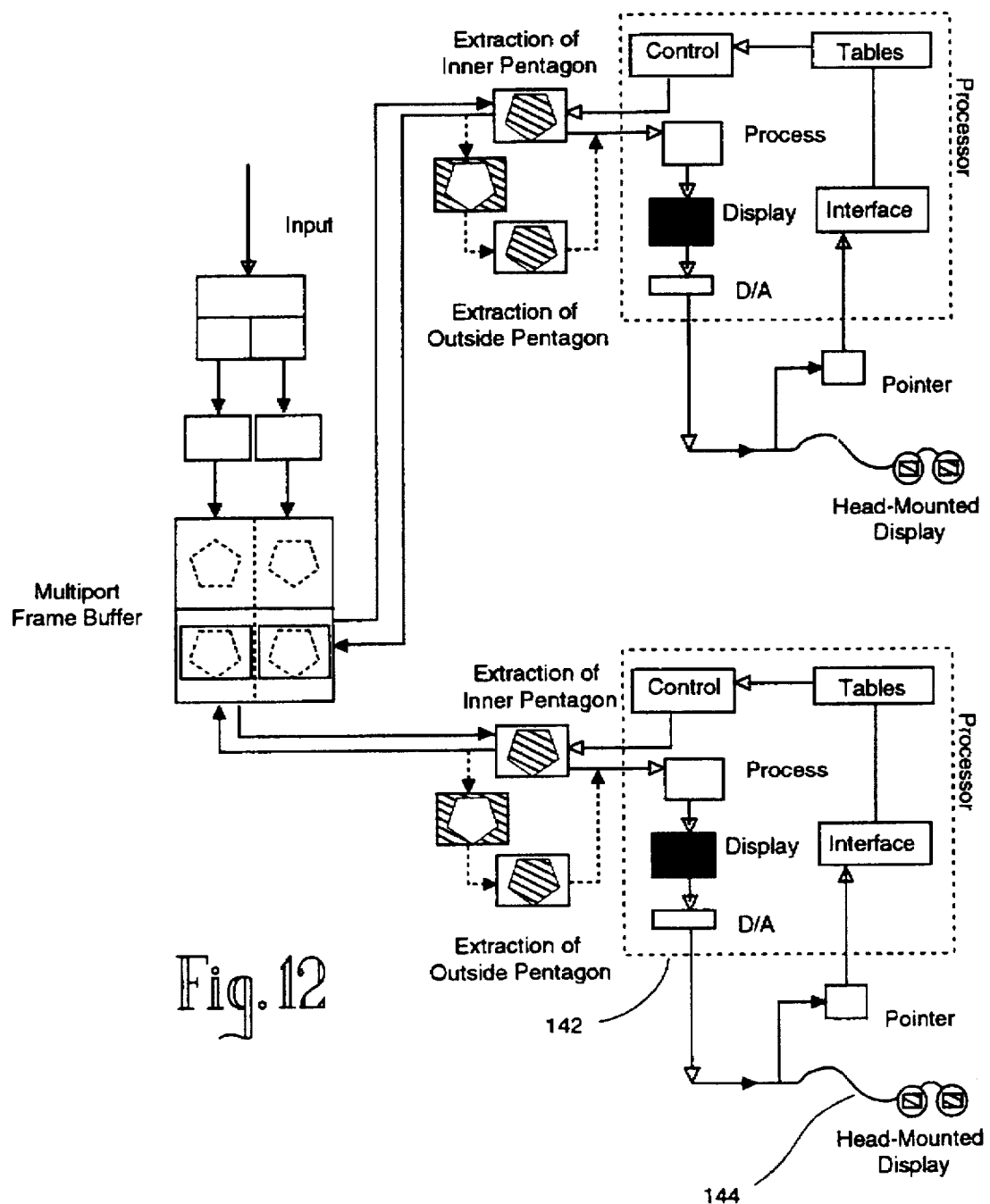
FIG. 12: Another block diagram of the present invention, showing additional means for independant access to the components of the panoramic image by a second viewer.

In the simplest expression of the present invention, these other HMD's see what the original HMD sees, as a multipication of the output video signal, and the user of the original HMD controls the direction of the gaze for all of them. But if parallel extraction and display buffer generation can be applied through the means of the present invention on behalf of these other HMDs as well, then each HMD can look around simultaneously and independently within the same Datasphere. FIG. 12 illustrates this with a block diagram showing additional means for independent access 142 to the components of the panoramic image by a second viewing device at 144.

The latency in the present invention system is roughly equal to 16.6 milliseconds, equal to the response time of high-end tracking systems, and the time it takes to rescan a set of video fields, because at least one field of the transmitted video frames must be fully digitized before the process of selecting the region of interest from among them can be completed. (To ensure synchronization between the sound and the extracted image, a delay filter should be introduced for the soundtrack, equal to inherent delay in the display system.) This response time is still far superior to computer-generated VR systems because the scene does not have to be generated from scratch. Thus, the present invention can be the viewing tool for more vivid, involving, and creative form of panoramic television.

The means for organization of a dual alternating main memory buffer allows one new field of an incoming interlaced video signal to be digitized while readout proceeds on the previous field. In the arrangement of the pixel information shown in FIG. 4, the location of the two alternate memory buffers can be interleaved as alternate pixels. For example the odd-numbered pixels, corresponding to one video field, can belong to one buffer being read, while the even-numbered addresses, corresponding to the other video field, can belong to another buffer being written.

For the common field-alternating form of stereographic display, such as is is used in Virtual I*O's i-glasses!™ head-mounted displays, the alternate fields are presented to the right and left-eye views to achieve a 3-D effect. In many systems, line and frame-doubling is used to increase the apparent resolution and the apparent frame speed in each eye from 15 to 30 fps.

Figure 13:
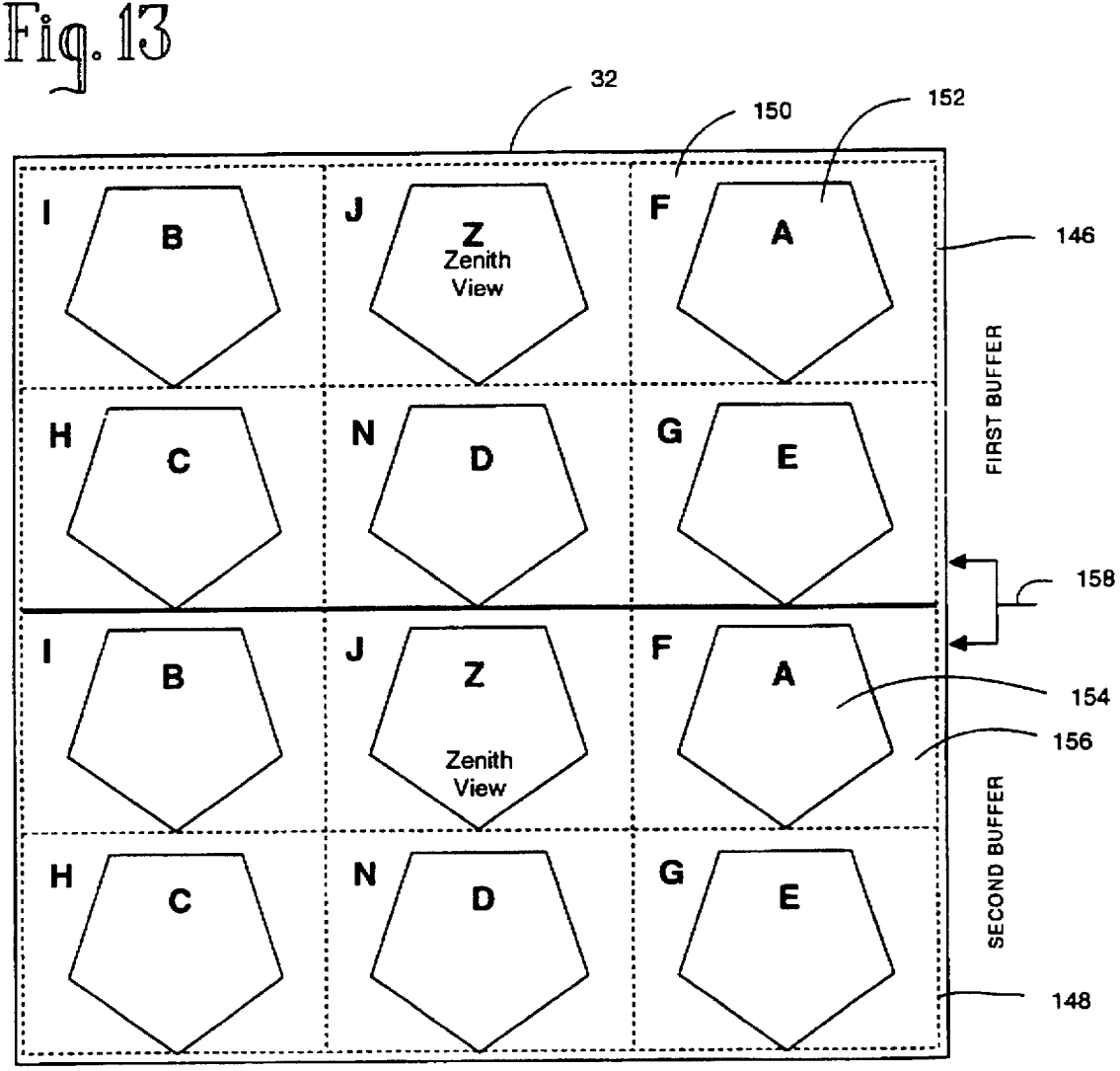
FIG. 13: Diagram of the main frame buffer, divided into two divisions, with each containing the video information on six video frames representing a complete set of twelve pentagons.

Another method of separating the two buffers without interleaving is shown in FIG. 13, a schematic diagram of the main frame buffer, divided into two divisions at 146 and 148, with each here containing the video information on six video frames representing a complete set of twelve pentagons, here with the below-horizon pentagons like 150 encoded in the areas outside central pentagons like 152. The switching of the storage and access addresses between these two divisions at 158 can be triggered at the change of fields in the incoming video signal, with readout of the regions at 150 and 152 being done while regions at 154 and 156 are being stored.

If only one of these buffers is used, and the six video signals represent twelve pentagons, with interleaved read-write for the pixels, as described for FIG. 4, then a full spherical image can be described by six input video signals. And if these video signals contain stereographic right-left divisions of their field, then this spherical image will be in 3-D.

Figure 14:
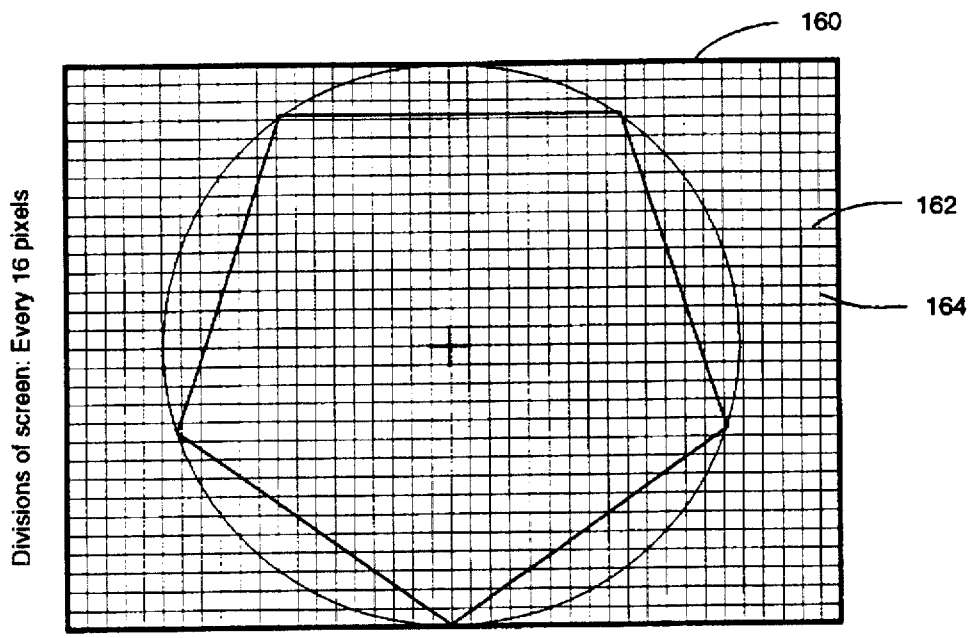
FIG. 14: An alternate method of arranging the multiple pentagons according to a Mercator-Robinson projection.
Figure 15:
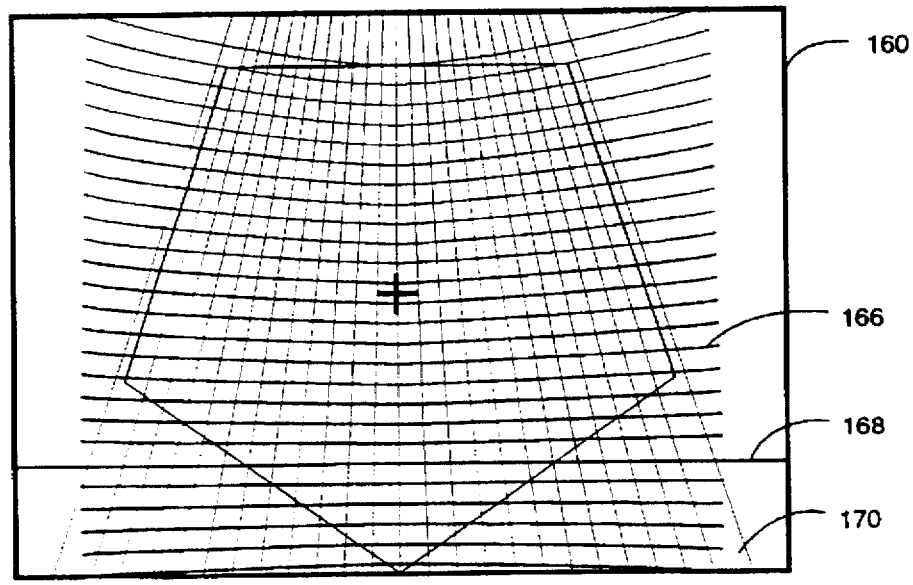
FIG. 15: Representation of the pixels in a video image, at a division of sixteen pixels each.

One way to approach the calculation of the positions of the various video pixels onto a sphere is to assign them positions according to longitude and latitude. The projection of the pentagons onto a spherical surface representing the spherical field of view is according to a gnomonic projection, which proceeds from the center of the sphere, and creates straight edges for the pentagons, corresponding to great circle divisions of the sphere. In FIG. 14, a 640 by 480 pixel video image 160 is shown divided into sixteen-pixel square groups according to horizontal 162 and vertical 164 divisions. In FIG. 15, another equal division is shown on a sphere, showing the video image 160 expressed as a grid of latitude 166 and longitude 170 lines, according to the gnomonic projection. Note that the horizon 168 is a straight line, because it also is a great circle division.

To aid in calculating the tables of addresses for the means for translating the pixels from the storage buffer to the final display buffer, one can also think of ways in which the pentagons can be wrapped onto the surface of a sphere, and how this wrapping could be expressed as a two-dimensional surface.

Figure 16:
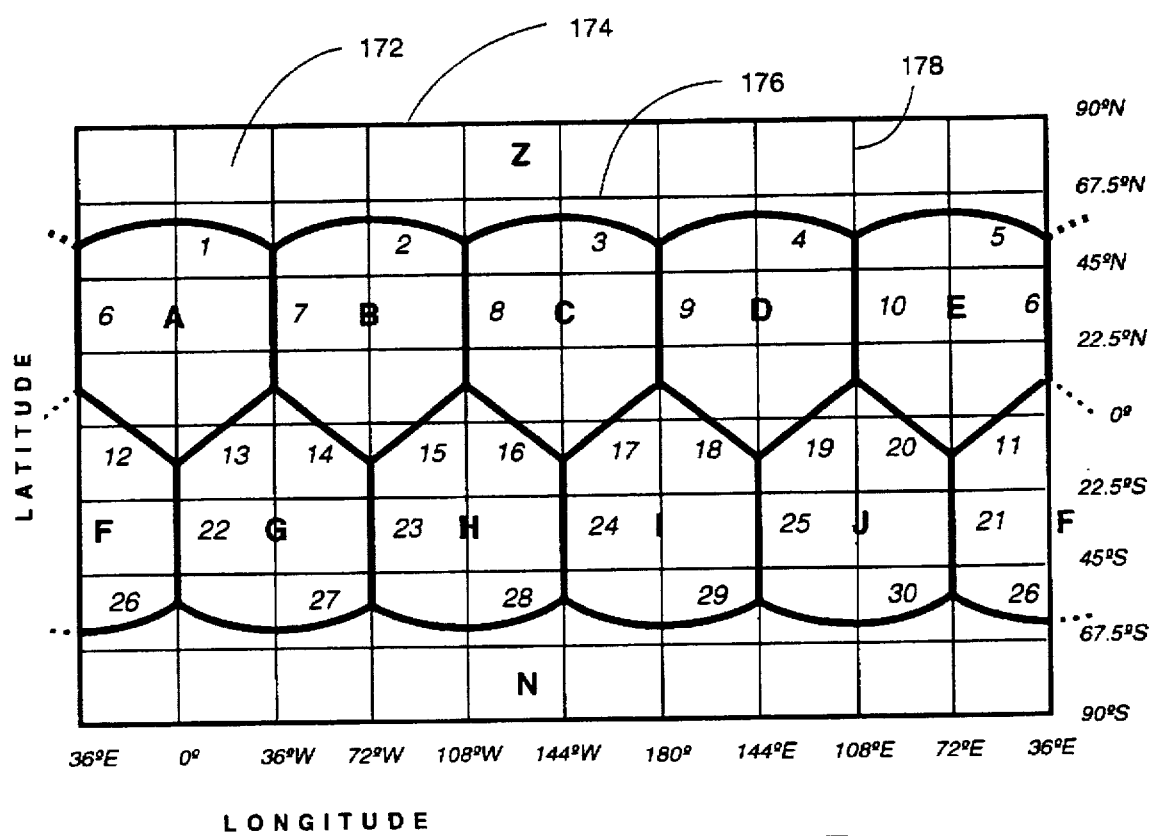
FIG. 16: Translation of a pentagonal section to longitude and latitude on a globe.

Besides a polar plot, an alternate way of mapping dodeca-hedral faces 172 onto a surface representing a globe 174 is shown in FIG. 16, based on a modified Mercator -Robinson projection. Here, the latitude lines 176 have equal spacing, and the longitude lines 178 are straight and vertical. This also produces an image representing the sphere and the dodecahedral faces comprising it that is rectangular, roughly the shape of an HDTV video image. The faces are lettered and the edges are numbered as in FIG. 5.

This overall map of the sphere and the images covering it can be the link between them and production equipment designed to work on single rectangular images, such as switchers, computer animation programs and pixel alteration filters such as in Adobe Photoshop, Kai's Power Tools and CoSA After Effects. If changes applied to this map of the sphere can be linked to affect the higher-resolution individual pentagonal segments making up the main frame buffer of the main frame buffer and the pixels inhabiting them, then effects can be made to smoothly carry across multiple segments without discontinuities. The same can be done with other flat projections of a sphere, but none have as many advantages of direction and consistent scaling.

Figure 17:
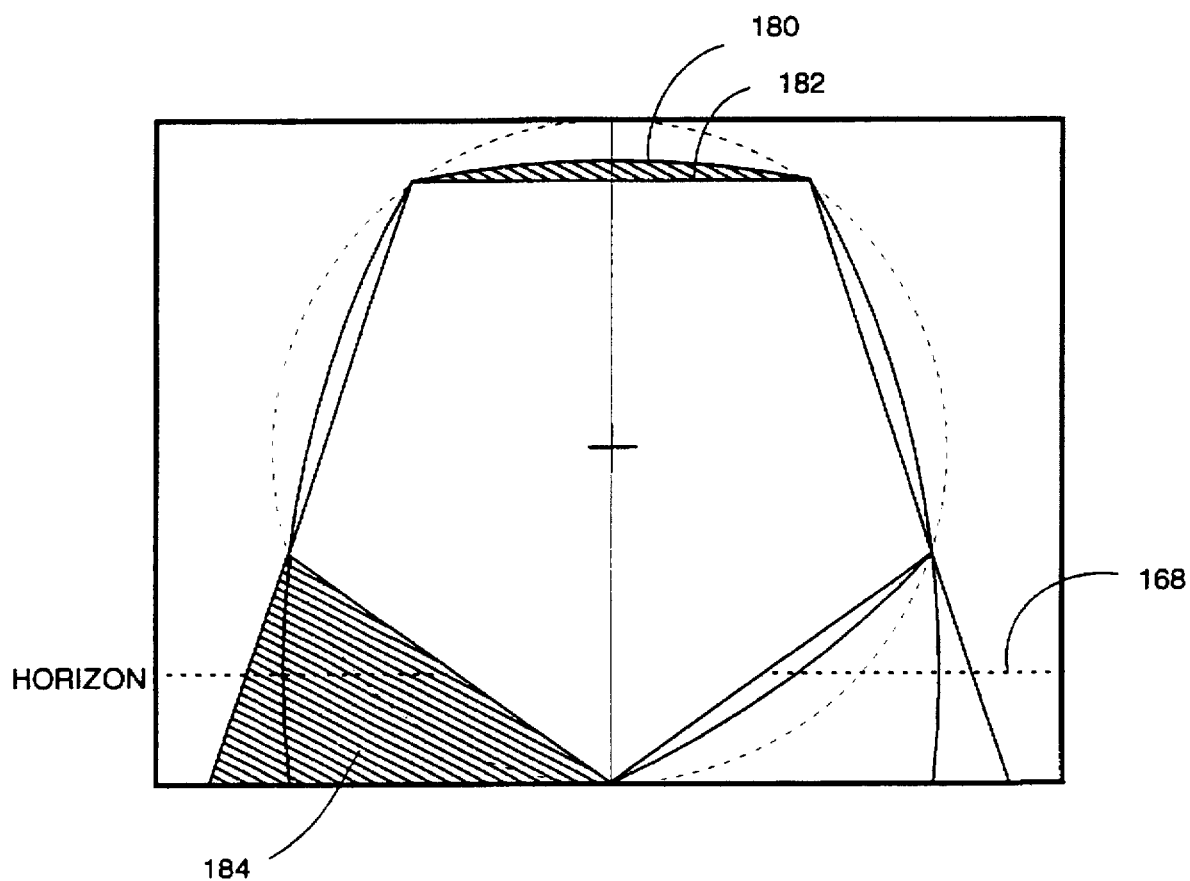
FIG. 17: View of the result of barrel distortion on longitude lines in a photographed concentric sphere, and the optimum view of these longitude lines in a pentagonal image segment.

Typically, due to the effects of common lens design, some optical distortion will be present in a photographed pentagonal segment. FIG. 17 is a view of the result of barrel distortion on longitude lines in a photographed concentric sphere, and the optimum view of these longitude lines in a pentagonal image segment. These longitude lines, representing the pentagon edges, are typically bowed 180 instead of straight 182. If the side edges are extended downwards to fill in the area on either side of the pentagon point, then they will make an overall keystone shape for the cropped image which include an extra area 184. This extra area is useful in filling in the outermost borders of pentagon groups, such as the bosom edge of a hemisphere made up of six pentagons.

The structure of dodecahedral segments in the present invention has the advantage of standard divisions of the sphere, with no compromise in resolution in any direction. The advantage in speed and simplicity inherent in the present invention will yield its best results if the input video signals are already optimized for blending together into an overall panoramic image. This means that a high degree of precision and control are called for in the producing, mastering and distributing process for the dodecahedral segments for input, to correct for any problems between them in terms of exposure, radiometric distortion, misalignment, and color balance. The more controlled the input segments are, the more natural and satisfying will be the resutlt.

As processing speed, storage capacity and video recording resolution increase, the resolution in the displayed image can increase as well. Advances in image compression technology, such as MPEG-2 and wavelet compression such as HARC-2 from the Houston Advanced Research Center, promise to cut down the bandwidth requirements for distributing video signal. And fractal compression, such as that introduced by Danlot Corporation of Glendale, Calif., enables a unique feature: the creation of a resolution-independent zoom. Because the fractal process can interpolate detail between the data points of an image, it can maintain sharpness even when the image is blown up, enabling apparently greater resolution in the portion of the image displayed than is shown in the original recording.

Other types of imagery can be adapted for viewing through this type of system. Any recording of a portion of a sphere can be viewed in this way, as long as it is mastered in the form of these individual pentagonal video segments. Other forms of dodecahedral recording, such as the double and triple-pentagon systems mentioned in the earlier patent, will works best if they are adapted during the mastering process to the single pentagon system, because it is the least common denominator. Other types of recorded images, such as those on film, can also be adapted to this means of image reproduction, preferably through digital image processing. This means that images from other panoramic formats, such as fisheye lens recordings, Circlevision and Omnimax, can be translated into groups and portions of pentagonal segments, to become part of a larger form of immersive media for the future.

I claim:

1. An apparatus for reproducing a portion of a spherical view up to a complete sphere, comprising:
    (a) input means for a plurality of video images representing a plurality of pentagonal sections derived from dodecahedral divisions of a spherical field of view,
    (b) digital memory means comprising a matrix wherein is stored information representing the pixels of said plurality of video images,
    (c) at least one viewing device with a movable viewing aperture window capable of reporting the location of said movable viewing aperture window on a sphere as a location signal, and capable of displaying at least a portion of said video images,
    (d) addressing means for said matrix whereby said information representing said pixels is presented to said aperture window of said viewing device according to said location signal so that the edges of pentagonal sections originally adjacent to each other in the spherical field of view are made adjacent also within said aperture window, thereby creating an apparent substantially continuous image within said aperture window.

2. The apparatus of claim 1, wherein each of said video images includes a representation of only one of said pentagonal sections.

3. The apparatus of claim 2, wherein the addressing means for said matrix include programmable logic devices for identifying the borders of said pentagonal sections within said video images.

4. The apparatus of claim 1, wherein said plurality of pentagonal sections derived from dodecahedral divisions of a spherical field of view includes at least one stereoscopically offset pair, and said viewing device is also stereoscopic.

5. The apparatus of claim 1, wherein at least one of said video images includes both a representation of a first pentagonal section and a second pentagonal section, and said representation of said second pentagonal section is encoded in the image area of said video image surrounding said representation of a first pentagonal section, with means for addressing the constituent parts of said second pentagonal section.

6. The apparatus of claim 5, wherein said means for addressing the constituent parts of said second pentagonal section comprise a programmable logic device.

7. The apparatus of claim 4, wherein at least one of said video images includes both a representation of a first pentagonal section and a second pentagonal section, and said representation of said second pentagonal section is encoded in the image area in said video image surrounding said representation of a first pentagonal section, with means for addressing the constituent parts of said second pentagonal section, and said second pentagonal section represents a stereoscopically offset view of one of said plurality of pentagonal sections derived from dodecahedral divisions of a spherical field of view.

8. The apparatus of claim 7, wherein said means for addressing the constituent parts of said second pentagonal section comprise a programmable logic device.

9. The apparatus of claim 7, wherein said second pentagonal section represents a stereoscopically offset view of said first pentagonal section.

10. The apparatus of claim 1, wherein said matrix of said digital memory means include a dual memory arrangement means for allowing storage of incoming video frames to be done at the same time as previously-stored video frame information is being addressed by said addressing means for said matrix whereby said information representing said pixels is presented to said aperture window.

11. The apparatus of claim 10, wherein said dual memory arrangment allows stereoscopic readout by means of field-sequential presentation of right and left-eye views.

12. The apparatus of claim 1, wherein said addressing means for said matrix whereby said information representing said pixels is presented to said aperture window use prestored address tables based on the location of a region of interest reported from said viewing device.

13. The apparatus of claim 1, wherein said input means for a plurality of video images includes multichannel tuner means.

14. The apparatus of claim 1, wherein said input means for a plurality of video images includes conversion of an analog signal representing at least one of said video images into a digital form suitable for storage in said digital memory means.

15. The apparatus of claim 1, wherein said information representing said pixels is presented to said aperture window of said viewing device by means of a secondary memory buffer which is scanned after it is filled to produce an output signal suitable for display by said viewing device.

16. The apparatus of claim 12, wherein said output signal is in the form of National Television Standards Committee (NTSC) video.

17. The apparatus of claim 15, wherein said secondary memory buffer also includes means for fractal decompression of the image pixels to interpolate between them.

18. The apparatus of claim 1, wherein a plurality of viewing devices with movable viewing aperture windows are coupled to a plurality of addressing means for said matrix whereby said information representing said pixels is independently presented to said aperture windows of said viewing devices according to said location signals generated by each.

* * * * *

UNITED STATES PATENT AND TRADEMARK OFFICE
CERTIFICATE OF CORRECTION

PATENT NO. : 5,703,604
DATED : Dec. 30, 1997
INVENTOR(S) : David McCutchen

It is certified that error appears in the above-identified patent and that said Letters Patent is hereby corrected as shown below:

On title page, item [54] and col. 1, lines 1-2,
In the Title, The word "Dodecahedral" is misspelled, so please change "IMMERSIVE DODECAHERDRAL VIDEO VIEWING SYSTEM" TO "IMMERSIVE DODECAHEDRAL VIDEO VIEWING SYSTEM".

In Col. 5, line 57, change 'Channels:carrying' to -- channels carrying -- .

Also in Col. 5, line 59 correct the misspelling 'frequendes' to -- frequencies -- .

In Col. 7, line 35, correct the misspelling 'dockwise' to -- clockwise -- .

Also in Col. 7, line 39, correct the misspelling 'dockwise' to -- clockwise -- .

In Col. 8, line 39, correct the misspelling 'charmels' to -- channels -- .

In Col. 9, line 27, correct the misspelling 'Preplofted' to -- Preplotted -- .

In Col. 10, line 8, please correct the misspelling 'shoLid' to -- should -- .

In Col. 10, line 19, please correct the misspelling 'Using' to -- using -- .

In Col. 13, line 47, please correct the misspelling 'reproduring' to -- reproducing --

UNITED STATES PATENT AND TRADEMARK OFFICE
CERTIFICATE OF CORRECTION

PATENT NO. : 5,703,604
DATED : Dec. 30, 1997
INVENTOR(S) : David McCutchen

It is certified that error appears in the above-identified patent and that said Letters Patent is hereby corrected as shown below:

In Col. 3 line 54, for more accuracy in matching the figure and clarity of meaning, please change "a Mercator - Robinson projection" to "an Equirectangular Projection".

Also in Col. 12, line 37-38, for the same reasons, please change "a modified Mercator - Robinson projection" to "an Equirectangular Projection".

Signed and Sealed this

Eighth Day of September, 1998

Attest:

BRUCE LEHMAN

*Attesting Officer*     *Commissioner of Patents and Trademarks*